Patented Dec. 1, 1942

2,303,703

UNITED STATES PATENT OFFICE 2,303,703

METHOD OF DEWAXING MINERAL OILS

Benjamin Miller, Richmond Hill, N. Y., assignor to Cities Service Oil Company, New York, N. Y., a corporation of Pennsylvania No Drawing. Application May 9, 1933,
Serial No. 670,215

17 Claims. (Cl. 196—18)

This invention relates to a process for dewaxing petroleum oils. It is particularly suited to the removal of the petrolatum type of wax, but is also adapted to the removal of paraffin or crystalline wax.

There are three commonly used methods for removing petrolatum. In all of them the oil is cooled until the petrolatum precipitates, and is thereafter separated. The oldest or "cold settling" method involves the step of diluting the oil with naphtha. The oil-naphtha blend—occasionally the undiluted oil—is slowly cooled to a temperature below the pour point desired, then allowed to stand until the precipitated petrolatum settles to the bottom. The oil-naphtha blend is then decanted from the petrolatum, and the oil and naphtha separated by distillation. This process has disadvantages which have led to a search for better methods, and has now been practically abandoned for methods involving the use of the centrifuge and filters (with filter aid). The present invention is particularly designed to overcome the defects of the old cold settling method, with the object of making unnecessary the use of the centrifuge or the filter, but it should be understood that the centrifuge or the filter may be used for separating the wax from the oil.

The old cold settling method has as its chief disadvantage the time required. It was not unusual for oil to be allowed to stand during the entire winter where atmospheric cooling was relied on. Where artificial cooling was used the process took many days. The second disadvantage was the limited applicability of the process. It was commercially impossible to produce oils of 150–160 seconds Saybolt at 210° F., with a pour point of 0° F. To produce oil of zero pour point the oil-naphtha blend must be chilled to a temperature below zero degrees F. The petrolatum precipitates, but the settling is so slow that a satisfactory separation is impossible.

The rate of settling in all cold settling processes is dependent on three factors:

1. The surface per unit volume of the petrolatum.
2. The difference in density between the petrolatum and the medium through which it must settle, and
3. The viscosity of the medium.

For rapid settling, the surface-volume ratio should be small, the difference in density should be great, and the viscosity should be low. The surface-volume ratio is determined in part by the properties of the solution from which the petrolatum precipitates, but principally by the rate at which the precipitation takes place. The latter depends on the difference between the actual temperature of the solution and the saturation temperature. The oil-diluent solution may be cooled somewhat below the saturation temperature before precipitation starts. As soon as a precipitate exists, the solution in contact with the precipitate deposits its excess petrolatum on that precipitate. The rate at which the precipitate can grow depends on the viscosity of the solution, the growth being more rapid in the less viscous solution. Therefore, if the temperature is lowered slowly, the surface-volume ratio will be relatively small, but with viscous oils it is not feasible to cool slowly enough to get a small surface-volume ratio. By diluting the oil with naphtha the viscosity is reduced, and the solubility is increased, so that by cooling during several days a practical surface-volume ratio may be obtained. At the same time the difference in density is increased, and, as previously mentioned, the viscosity is lowered.

In the cold settling of oil-naphtha blends however, the solubility of the wax in the blend is increased, so that it becomes necessary to cool far below the desired pour point for the oil. For example, to produce an oil with a pour point of 25° F. it is necessary to cool a blend of two parts naphtha to one prt of oil of 150 seconds Saybolt at 210° F. to —20° F. That is, such a blend retains in solution at —20° F. so much petrolatum that the finished oil will have a pour point of 25° F. At a temperature of —20° F., the viscosity of such a naphtha-oil blend is so high that cold settling requires an impracticably long time, while at the much lower temperatures (—50° F. and lower) required to get zero pour oil, cold settling becomes impossible. Increasing the proportion of naphtha will not help, since the viscosity decreases slowly after the proportion of diluent exceeds 60%; in addition, the quantity of naphtha to be handled per unit of oil produced increases rapidly.

The two methods which have replaced "cold settling" involve the use of means for overcoming the handicap of high viscosity. The centrifuge replaces gravity by centrifugal force and multiplies the normal difference in density between the wax and oil-diluent blend. In the filtering methods the difference in density is not used, but the oil mixture is forced through a diaphragm which retains the petrolatum.

The primary object therefore of the present invention is to overcome certain of the difficulties previously encountered in the dewaxing of petroleum oils, and to provide a process in which the petrolatum may be rapidly separated from the oil blend without resorting to expensive and unusual methods of treatment.

A further object of the invention is to provide a process for dewaxing oils in which the viscosity and specific gravity of the oil to be dewaxed are so greatly reduced that a rapid settling of petrolatum or crystalline wax may take place.

Accordingly, the process of the present invention includes as an important feature the mixing of a low molecular weight hydrocarbon such as propane, in the liquid phase, with the petroleum oil to be dewaxed, the resulting mixture in the case of heavy stocks containing from 50 to 80% by volume of the hydrocarbon and in the case of lighter oils proportionately less hydrocarbon, chilling the mixture to a temperature below the pour point desired for the final oil product to cause precipitation of the wax or petrolatum content of the mixture, separating the resulting precipitated wax or petrolatum from the chilled mixture, and removing the hydrocarbon from the dewaxed oil.

The present invention is particularly applicable to the removal of petrolatum from mineral oils, and also applies to the removal of filterable wax. It also includes other features, objects and advantages which will be apparent from the following detailed description:

The mineral oil to be dewaxed may include treated or untreated petroleum oil residuums or overhead distillates containing wax. The oil to be dewaxed is mixed with a substantial proportion of a hydrocarbon or mixture of hydrocarbons having a Reid vapor pressure of not less than 15 pounds per square inch at 100° F., a density not greater than seven tenths that of water at 60° F., and a viscosity of not more than half that of water at the same temperature. This mixing may be carried out in any type of mixing chamber in which a pressure is maintained sufficiently high to hold the hydrocarbon in the liquid phase at the temperature used for mixing. The oil and hydrocarbon are mixed at a temperature sufficiently high to secure complete miscibility, which in some cases may be from 90 to 125° F.

The oil to be dewaxed after being mixed with the necessary proportion of the liquid hydrocarbon depending on the oil to be dewaxed may be passed through one or more chilling zones, in which the oil-hydrocarbon blend may be chilled by any convenient and well-known procedure. For example, the oil blend may be passed through tubes provided with internal scrapers, around which a cooling medium or refrigerant is conducted or the chilling may be conducted as a batch operation.

The chilling of the oil blend is preferably carried out so that it is first cooled to a temperature slightly below that at which wax precipitation commences. The oil blend is then held at substantially this temperature or slowly cooled until a large part of the petrolatum has precipitated, after which the oil blend may be rapidly chilled to the desired low temperature. The rapid chilling following the precipitation of petrolatum may be accomplished at least in part by adding to the oil blend an additional quantity of the hydrocarbon blending liquid having a temperature of from −20° to −60° F. It is not necessary to add all the diluent in making the initial blend. This procedure insures the formation of relatively large petrolatum nuclei which are the result of the growth of the first small nuclei formed in the mixture as the precipitation commenced. The further dilution of the oil blend prior to the final rapid chilling gives a blend of low viscosity from which the petrolatum rapidly settles. The temperature to which the oil mixture is to be finally chilled will depend upon the character of the oil being dewaxed and upon the cold test desired for the final product. In general the mixture should be chilled to a temperature below that selected for the pour point of the final product.

The chilled oil blend containing the precipitated petrolatum or wax in suspension is conducted from the final chilling zone to a separator such as a gas-tight thickner in which the wax is separated by gravity from the oil blend. The cold dewaxed oil is conducted from the separator into a pressure still for the removal of the hydrocarbon as vapors, after which the oil is conducted from the still to storage or subjected to further treatment to place it in condition for use. The hydrocarbon vapors removed from the still are condensed under pressure and conducted to storage, ready for reuse in the process. The dewaxed oil blend discharged from the separator and prior to the removal of the diluent may be used for cooling the hydrocarbon mixed with the oil blend after the commencing of wax precipitation therein, or the cold dewaxed oil may be used for condensing the hydrocarbon vapors from the still.

The wax or petrolatum settled out in the separator usually contains small amounts of oil which may be washed therefrom with a small quantity of fresh cold hydrocarbon diluent. The wash liquor separated from the wax may be conducted directly to the still unless it contains too much wax or petrolatum, in which case it is mixed with the oil-hydrocarbon blend to be, or being chilled.

The following example will illustrate the effectiveness of the invention: A filtered Pennsylvania cylinder stock having a viscosity of 151 seconds Saybolt at 210° F. and a pour point of 70° F. was blended with commercial propane. The blend contained about 43% oil by weight, or 30% oil by volume. The blend was heated to 110° F., agitated to make a homogeneous solution and then cooled in stages as follows:

|  | Hours |
|---|---|
| From 110° F. to 85° F. | 3 |
| From 85° F. to 50° F. | 6½ |
| From 50° F. to 34° F. | 10 |
| From 34° F. to −58° F. | 1 |

The blend was allowed to stand at the final temperature until the petrolatum appeared to have completely settled. This required about 5 hours. An additional hour of standing was allowed. The mixture was then separated into three portions. The upper half of the supernatant liquid was removed for one portion. Then the remaining supernatant liquid was completely removed, taking as little as possible of the petrolatum. To the remaining petrolatum layer was added about three-quarters of its volume of cold liquid propane, the mixture agitated, and then allowed to stand until settling appeared complete, which required two hours. The supernatant liquid was then withdrawn. The four portions were freed from propane and examined. The oil from the first portion had a pour point of −5° F., the oil from the second a pour point of 25° F., and the oil from the wash liquid a pour point of 45° F.

The petrolatum had a melting point of 108° F.

The process of the present invention is particularly adapted for the removal of petrolatum from mineral oils, but may also be applied to the removal of paraffin or filterable wax. In the latter case the wax may be settled into a slurry from the major part of the oil blend. After decanting of the oil, the slurry may be filter pressed in the usual way. In this process, the crystalline wax settles very rapidly, and the slurry is easily filtered because of the low viscosity of the oil blend content therein. It is to be understood that the term "wax" used in the present application includes petrolatum (amorphous wax) or crystalline wax.

The hydrocarbon blending agent referred to in the foregoing description, and therein defined, may comprise for example one or more of the hydrocarbons, ethane, propane, the butanes, the corresponding olefins and napthenes, and mixtures of any of these with one another or with other hydrocarbons, provided that in any case the hydrocarbon blending agent is characterized by a Reid vapor pressure of not less than 15 pounds per square inch at 100° F., a density not greater than 0.7 that of water of 60° F. and a viscosity not greater than 0.5 that of water at the same temperature. In the recovery of condensible constituents from natural gas and cracking still gases, hydrocarbon fractions are now obtained which are suitable for the process. For example, commercial propane and commercial butane may be mentioned. Two to four parts of liquid propane are used for diluting one part of oil stock. In using a mixture of hydrocarbons it should preferably have a comparatively narrow boiling range since the pressures and temperatures maintained in the process can be more accurately controlled with such diluents.

It is to be understood that the process may be carried out in any apparatus suitable for dewaxing oils, whether batch or continuous, but that the elements of the apparatus employed must be closed and adapted to withstand substantial superatmospheric pressure. In at least the initial stages of the process substantial pressures must be maintained, particularly where the lower hydrocarbons are employed as diluents.

The process of the present invention may be applied in the dewaxing of mixed base oils as well as paraffin base oils since any asphalt present precipitates with the wax. Furthermore the process is particularly applicable to the dewaxing of oils prior to filtration because later clay filtering does not raise the pour point of the oil as is usually the case with oils dewaxed by the naphtha process. It appears that the low molecular weight hydrocarbon diluent has the property of precipitating any natural wax solvents (or precipitation inhibitors) along with the wax.

Various modifications may be made in the steps and conditions under which the process of the present invention is carried out without departing from the spirit and scope thereof. The invention has been described in connection with certain specific examples, but it is further to be understood that the invention is not to be limited thereto except as so limited by the appended claims which form a part of this application.

Having thus described the invention in its preferred form, what is claimed as new is:

1. A process for dewaxing oil which comprises mixing said oil containing wax with a hydrocarbon diluent, chilling said oil solvent solution to precipitate wax comprising a mixture of more readily settling wax and less readily settling wax, settling the cooled mixture to effect separation of precipitated wax, withdrawing oil solvent solution substantially free from precipitated wax from the upper part of the settling zone, withdrawing settled wax from the lower part of said zone and withdrawing oil solvent solution containing unsettled wax from a point intermediate said upper and lower parts of the settling zone.

2. A process for dewaxing oil which comprises mixing said oil containing wax with a liquefied normally gaseous hydrocarbon solvent, chilling said oil solvent solution to precipitate said wax, said precipitated wax comprising a mixture of more readily settling wax and less readily settling wax, passing said oil solvent solution containing said precipitated wax into a settling chamber, stratifying said oil solvent solution containing precipitated wax in said settling chamber into three layers, an upper layer of oil and solvent substantially free from wax, a lower layer of the more readily settling wax, and an intermediate layer of oil and solvent containing said less readily settling wax, withdrawing said upper layer of oil and solvent from said settling chamber, and withdrawing said intermediate layer of oil and solvent containing said less readily settling wax from said settling chamber, whereby said less readily settling wax is prevented from passing into said layer of oil and solvent during said withdrawal of said upper layer of oil and solvent.

3. The process for dewaxing oil which comprises mixing the wax containing oil to be dewaxed with a liquid normally gaseous hydrocarbon diluent, chilling the oil diluent solution to precipitate wax, stratifying the resulting mixture of oil, diluent and precipitated wax in a settling chamber in which the major portion of the wax collects as a lower layer, withdrawing from the chamber an upper layer of oil and diluent substantially free of wax the oil of which has a relatively low pour point, and withdrawing from said chamber, above the lower layer containing the major portion of the wax, an intermediate layer of oil and diluent the oil of which has a substantially higher pour point than the oil of said upper layer.

4. The process for dewaxing oils as defined by claim 3 in which said diluent is propane.

5. The process of dewaxing a filtered Pennsylvania cylinder stock, which comprises mixing the cylinder stock with liquid propane in a proportion such that the resulting blend contains approximately 30% oil by volume, heating and agitating the mixture to bring about homogeneous mixture of the oil and the liquid propane, chilling the solution of oil and propane to a temperature of from —20° to —60° F. to precipitate wax in the solution, separating the precipitated wax, and finally removing the propane from the resulting dewaxed cylinder stock.

6. The process of dewaxing filtered Pennsylvania cylinder stocks, comprising diluting the stock with a liquefied normally gaseous hydrocarbon to materially reduce the viscosity of the oil, effecting homogeneous mixture of the oil and the liquid normally gaseous hydrocarbon by heating and agitating the mixture, chilling the resulting mixture to a low temperature sufficient to precipitate the wax in the mixture while retaining substantially all of the diluent in the mixture, separating the precipitated wax from the chilled mixture, and finally removing the liquefied normally gaseous hydrocarbon from the dewaxed cylinder stock.

7. The process of dewaxing wax-containing petroleum oils which comprises mixing with the oil to be dewaxed a liquid normally gaseous hydrocarbon which is liquid at dewaxing temperatures to reduce the viscosity and specific gravity of the oil, cooling the resulting mixture to a temperature slightly below that at which wax nuclei begin to form in the mixture, maintaining substantially this temperature for a period of time during which said nuclei are permitted to grow, thereafter rapidly chilling the mixture to a temperature below that of the pour point desired in the final product while holding said liquid normally gaseous hydrocarbon in the mixture during said cooling and chilling operations, and separating the precipitated wax from the mixture.

8. The process of removing petrolatum from filtered, that is, clay treated, Pennsylvania cylinder stocks having relatively high pour points and having a viscosity of approximately 150 Saybolt at 210° F. which comprises diluting the stock with a liquefied normally gaseous hydrocarbon diluent which is liquid at minus 60° F. to materially reduce the viscosity of the oil and provide a solution containing a greater volume of diluent than of oil stock, chilling the resulting solution to a low temperature sufficient to precipitate the petrolatum therein, removing the precipitated petrolatum from the chilled mixture and finally removing the liquefied diluent from the cylinder stock which has been substantially freed of petrolatum.

9. The process as defined by claim 8 in which the petrolatum is separated from the chilled mixture by stratifying the mixture containing the precipitated petrolatum in a settling zone so that the petrolatum is accumulated at the bottom of the zone, then removing the upper layer of oil stock and diluent substantially free of precipitated petrolatum from the settling zone, removing a second layer comprising a mixture of oil stock containing substantial proportions of incompletely separated petrolatum, separately removing the lower layer containing the major proportion of petrolatum from said zone, and freeing said removed second oil stock layer of hydrocarbon diluent to produce a partially dewaxed oil stock having a substantially lower pour point than the original stock.

10. The process of removing petrolatum from clay treated cylinder stocks as defined by claim 8 in which the precipitated and removed petrolatum is mixed with an additional proportion of liquefied normally gaseous hydrocarbon and the resulting mixture settled to again precipitate the petrolatum, and thereafter recovering the precipitated petrolatum free from diluent.

11. The process of removing petrolatum from filtered, that is, clay treated, Pennsylvania cylinder stock, which comprises mixing the cylinder stock with liquid propane in a proportion such that the resulting blend contains approximately 30% of cylinder stock by volume, effecting the mixing under temperature conditions adapted to secure complete miscibility of the oil stock and the liquid propane, cooling the resulting solution to a temperature in the range of minus 20° to minus 60° F. which is sufficiently low to precipitate or crystallize the petrolatum in the solution, separating the precipitated petrolatum from the resulting chilled mixture, and removing the propane from the resulting cylinder oil stock.

12. The process of removing petrolatum from filtered, that is, clay treated, cylinder stocks, which comprises mixing the stock with a liquefied normally gaseous hydrocarbon diluent which is liquid at minus 60° F. to materially reduce the viscosity of the stock, effecting the mixing under temperature conditions adapted to secure complete miscibility of the oil stock and the liquid hydrocarbon diluent, chilling the resulting mixture to a low temperature sufficient to precipitate or crystallize the petrolatum therein while retaining substantially all of the liquid hydrocarbon diluent in the mixture, separating the precipitated petrolatum from the chilled mixture, and removing the liquid hydrocarbon diluent from the resulting cylinder stock which is substantially free of petrolatum.

13. A process for producing viscous lubricating oils having low pour points from residual viscous oils containing petrolatum and having a viscosity of approximately 150 Saybolt at 210° F., which comprises forming a solution of the viscous oil in a liquefied normally gaseous hydrocarbon solvent which is liquid at temperatures below the desired low pour point temperature, cooling the mixture to a temperature substantially lower than the desired pour point for the finished oil whereby a precipitated petrolatum phase appears, stratifying the materials by gravity to allow the formation of a liquid phase upper oil layer substantially free of petrolatum, decanting the upper layer, and removing the hydrocarbon solvent from the decanted upper oil layer to produce the desired viscous lubricating oil.

14. The process of removing petrolatum from filtered, that is, clay treated, cylinder stocks, which comprises mixing the cylinder stock with a liquefied normally gaseous hydrocarbon diluent which is liquid at minus 60° F. in a proportion such that the resulting mixture contains approximately 30% by volume of cylinder stock, chilling the resulting mixture to a temperature from minus 20° to minus 60° F. which is sufficiently low to precipitate or crystallize petrolatum in the mixture, retaining all of the liquefied hydrocarbon diluent in the mixture during the chilling operation, separating the precipitated petrolatum from the chilled mixture containing the desired cylinder stock constituents, and removing the diluent from the cylinder stock which is substantially freed of petrolatum.

15. A process for dewaxing oil which comprises, mixing said oil containing wax with a liquid normally gaseous hydrocarbon diluent, chilling said oil-diluent solution to precipitate wax comprising a mixture of more readily settling wax and less readily settling wax, settling the cooled mixture in a settling zone to effect separation of the mixture into three layers comprising an oil diluent layer substantially free from precipitated wax, an oil diluent layer containing incompletely settled less readily settling wax and a settled wax layer, and separately removing said layers from the settling zone.

16. A process for dewaxing oil which comprises, mixing said oil containing wax with a liquefied normally gaseous hydrocarbon solvent, chilling said oil solvent solution to precipitate said wax, said precipitated wax comprising a mixture of more readily settling wax and less readily settling wax, stratifying said oil solvent solution containing precipitated wax into three layers in a settling chamber, said layers comprising an upper oil solvent layer substantially free from precipitated wax, an intermediate oil solvent layer containing less readily settling wax and a lower layer containing more readily settling wax, and separately removing said upper and intermediate layers from the settling zone, whereby said less readily settling wax is prevented from passing into said upper layer of oil and solvent during the withdrawal of the same from said settling zone.

17. The process of dewaxing wax-containing petroleum oils which comprises, mixing the oil to be dewaxed with a liquid normally gaseous hydrocarbon which is liquid at dewaxing temperatures in sufficient proportion to substantially reduce the viscosity and specific gravity of the oil and thereby provide a fluid mixture at dewaxing temperatures, heating the final mixture to an elevated temperature and agitating the mixture at said temperature, thereafter cooling the resulting heated mixture to a temperature slightly below that at which wax nuclei begin to form therein, maintaining substantially this temperature for a period of time during which said nuclei are permitted to grow, thereafter rapidly chilling the mixture to a temperature below that of the pour point desired in the final product while retaining said liquid normally gaseous hydrocarbon in the mixture during said cooling and chilling operations, and separating the resulting precipitated wax from the mixture.

BENJAMIN MILLER.